United States Patent
Kurowsky et al.

(10) Patent No.: US 8,834,311 B1
(45) Date of Patent: Sep. 16, 2014

(54) CONCENTRIC ELECTRIC SERVOMOTOR/GEARBOX DRIVE

(71) Applicants: Joseph Kurowsky, Rensselaer, NY (US); Steven Pigliavento, Burnt Hills, NY (US)

(72) Inventors: Joseph Kurowsky, Rensselaer, NY (US); Steven Pigliavento, Burnt Hills, NY (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/788,646

(22) Filed: Mar. 7, 2013

(51) Int. Cl.
  *F16H 48/06* (2006.01)
  *F16H 1/28* (2006.01)
  *H02K 7/116* (2006.01)

(52) U.S. Cl.
  CPC . *F16H 1/28* (2013.01); *H02K 7/116* (2013.01)
  USPC .......................................................... 475/149

(58) Field of Classification Search
  None
  See application file for complete search history.

(56) References Cited

U.S. PATENT DOCUMENTS

| 4,021,690 | A  | * | 5/1977  | Burton .......................... 310/67 R |
| 4,185,215 | A  | * | 1/1980  | Montagu .......................... 310/83 |
| 4,274,023 | A  | * | 6/1981  | Lamprey .......................... 310/83 |
| 5,156,579 | A  | * | 10/1992 | Wakuta et al. ................. 475/161 |
| 5,246,082 | A  | * | 9/1993  | Alber .......................... 180/65.51 |
| 5,382,854 | A  | * | 1/1995  | Kawamoto et al. ......... 310/67 R |
| 6,328,123 | B1 | * | 12/2001 | Niemann et al. ............ 180/65.51 |
| 6,707,189 | B2 | * | 3/2004  | Ito et al. ....................... 310/75 R |
| 6,727,614 | B2 | * | 4/2004  | Neubauer et al. ........... 310/75 R |
| 7,052,428 | B2 | * | 5/2006  | Bolz .............................. 475/149 |
| 7,172,524 | B2 | * | 2/2007  | Moeller .............................. 475/5 |
| 7,250,017 | B2 | * | 7/2007  | Asa et al. .......................... 475/8 |
| 7,445,067 | B2 | * | 11/2008 | Marsh et al. ............... 180/65.51 |
| 7,556,580 | B2 | * | 7/2009  | Saito et al. ..................... 475/154 |
| 7,626,298 | B2 | * | 12/2009 | Atarashi ....................... 310/114 |
| 7,717,203 | B2 | * | 5/2010  | Yoshino et al. ............. 180/65.51 |
| 7,753,151 | B2 | * | 7/2010  | Marsh et al. ............... 180/65.51 |
| 7,815,535 | B2 | * | 10/2010 | Ai et al. ........................ 475/149 |
| 7,886,858 | B2 | * | 2/2011  | Ai ............................... 180/65.51 |
| 8,004,132 | B2 | * | 8/2011  | Fukuoka ........................ 310/83 |
| 8,033,942 | B2 | * | 10/2011 | Tesar ............................. 475/163 |
| 8,102,087 | B2 | * | 1/2012  | Yamamoto et al. ............ 310/83 |
| 8,186,467 | B2 | * | 5/2012  | Yoshino et al. ............. 180/65.51 |
| 8,245,804 | B2 | * | 8/2012  | van Rooij .................. 180/65.51 |
| 8,638,013 | B2 | * | 1/2014  | Takeuchi ...................... 310/75 R |
| 2004/0095037 | A1 | * | 5/2004 | Palmero ........................ 310/261 |
| 2010/0187954 | A1 | * | 7/2010 | Kendall et al. ............. 310/67 R |
| 2012/0176007 | A1 | * | 7/2012 | Takeuchi ..................... 310/68 B |
| 2013/0029803 | A1 | * | 1/2013 | Misala et al. ..................... 477/5 |
| 2013/0049439 | A1 | * | 2/2013 | Yamada et al. ................ 301/6.5 |

FOREIGN PATENT DOCUMENTS

| EP | 2073358 A2 * | 6/2009 | ............ H02K 7/116 |
| EP | 2269858 A1 * | 1/2011 | |
| WO | WO 2010115702 A1 * | 10/2010 | |
| WO | WO 2013189649 A1 * | 12/2013 | |

* cited by examiner

*Primary Examiner* — Dirk Wright
(74) *Attorney, Agent, or Firm* — Michael C. Sachs

(57) ABSTRACT

A drive system with a central longitudinal axis includes a brushless DC servomotor with a stator and a rotor disposed radially interior of the stator. The rotor defines a coaxial central void space. A planetary gear assembly connected to an input shaft and an output shaft is coaxially disposed in the central void space. A flange fixed to the rotor transfers torque to the input shaft. The ratio of the overall length of the drive system to its outer diameter is about one or less, thereby creating a power density along the central longitudinal axis that is greater than known electric motor/gear box drive systems.

14 Claims, 9 Drawing Sheets

CONCENTRIC ELECTRIC SERVOMOTOR/GEARBOX DRIVE

STATEMENT OF GOVERNMENT INTEREST

The inventions described herein may be manufactured, used and licensed by or for the United States Government.

BACKGROUND OF THE INVENTION

The invention relates in general to electric motor/gear drive systems and in particular to electric motor/gear drive systems for use in areas with limited space.

Electric motors have been widely used to power machinery. Electric motors are matched to gear drives, belts, chains, and other multipliers to provide more torque. In an environment where space and weight is limited, the need for packaging efficiency (overall size) is a critical factor in the ultimate solution to a torque multiplier problem.

Traditional mounting of the electric motor is to the input face of the gearbox. Gearboxes are generally constructed in an inline or right angle configuration, or use chain, belt, worm, or gear drives to transfer motion from a motor to the gearbox. If there are limitations in the available space in the output axis direction, an inline motor/gearbox may be too long. Compared to an inline gearbox, a right angle gearbox will shorten the output axis distance but will add to the space claim in the transverse axes. And, the right angle gearbox requires the addition of a gear set (i.e. bevel) to accomplish the change in direction of motion, which will usually limit the torque capacity of the drive. Higher torque capacity drives may require more space, increase the overall system weight, and have a lower efficiency (for example, worm drives).

Packaging of a parallel, over-and-under type arrangement between the gearbox and electric motor will provide a short space claim along the output shaft axis, but requires the addition of a transfer mechanism of some type (chain, belt, gears, etc.). Depending on the torque and speeds of the drive, the transfer mechanism can add significant weight and space claim, along with an increase in friction losses.

With respect to the electric motor, brushless DC servo motors have a greater power density (defined as torque output relative to volume of motor) in a large diameter/short axial length configuration than in a small diameter/long axial length configuration. To gain the required torque output of a servomotor in the more traditional small diameter/long axial length configuration, the axial length can become prohibitive. In traditional systems, the motor is mounted directly to the input face of the gearbox, resulting in a cantilevered load that is borne by the gearbox structure and mounting. In high g-loaded environments (high acceleration), the cantilevered load can put significant forces into the gearbox. These forces may require the use of a larger frame size configuration than usually needed for a given torque output, thereby increasing the weight and space claim of the drive system.

SUMMARY OF INVENTION

One aspect of the invention is a drive system having a central longitudinal axis. The drive system includes a brushless DC servomotor having a stator and a rotor. The stator includes a stator housing and stator motor windings. The rotor is disposed radially interior of the stator motor windings. The rotor has a hollow cylindrical base and a plurality of magnets fixed to a radially exterior surface of the base. The hollow cylindrical base defines a central void space. The stator and rotor are coaxial with the central longitudinal axis.

A first rotor flange is coaxially fixed to one end of the rotor. The first rotor flange defines a central opening coaxial with the central longitudinal axis. The first rotor flange includes a first portion of a two-portion torque transfer mechanism. An input shaft is disposed coaxially with the brushless DC servomotor. The input shaft includes a second portion of the two-portion torque transfer mechanism. The second portion of the torque transfer mechanism is in engagement with the first portion on the first rotor flange.

A first stator flange is fixed to one end of the stator housing and is coaxial with the central longitudinal axis. The first rotor flange is concentrically disposed within the first stator flange. A roller bearing is interposed between the first stator flange and the first rotor flange to support the one end of the rotor. A second rotor flange is coaxially fixed to another end of the rotor. The second rotor flange defines a central opening coaxial with the central longitudinal axis.

A second stator flange is fixed to another end of the stator housing and is coaxial with the central longitudinal axis. The second rotor flange is concentrically disposed within the second stator flange. A second roller bearing is disposed between the second stator flange and the second rotor flange to support the other end of the rotor.

A planetary gear assembly is fixed to the second stator flange and is concentric with the central longitudinal axis. The planetary gear assembly includes a housing with a ring gear on an interior of the housing. The housing is disposed in the central void space of the rotor. The input shaft extends into the housing and is rotatable with respect to the housing. The planetary gear assembly further includes a sun gear fixed to and rotatable with the input shaft and a plurality of planet gears that simultaneously mesh with both the ring gear and the sun gear. The planetary gear assembly further includes a carrier rotatably fixed to each of the planet gears.

An output shaft is rotatably fixed to the carrier and is coaxial with the central longitudinal axis. The output shaft extends through the planetary gear housing. The drive system has an overall length L and an external diameter d. Preferably, L/d is about one or less than one.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

A concentrically packaged electric servomotor and gearbox drive system can greatly reduce the space required along the axis of the output shaft and thereby solve the problem of packaging constraints on the available length of the servomotor and gearbox along the axis of the output shaft. The concentric servomotor/gearbox drive system can reduce the space required along the transverse axes and the overall system weight, compared to a known electric servomotor and gearbox packaged in a side-by-side configuration. The concentric servomotor/gearbox drive system can also eliminate the transfer mechanism and the backlash of the transfer mechanism (from motor output axis to the parallel gearbox output axis) required in a side-by-side configuration. The concentric servomotor/gearbox drive system advantageously uses the higher power density of a large diameter/short axial length servomotor, compared to the power density of a motor with a small diameter/long axial length.

Packaging the servomotor and gearbox in a concentric fashion reduces interfaces which must be sealed for environmental protection. The electric servomotor and gearbox may share one integrated mounting structure. The servomotor/gearbox drive system may include a feedback resolver and a brake, for control of the rotary actuation of a shaft-driven mechanism.

For a given torque output, electric brushless DC servomotors can be configured in two general ways: 1) multiple, smaller diameter rotor/stators oriented on the longitudinal axis; or 2) large diameter, short axial length rotor/stators. The combination of a large diameter, short axial length brushless DC servomotor disposed concentrically about an inline planetary gearbox can achieve an unmatched torque output for the axial space that is used.

The concentric electric servomotor/gearbox drive provides a greater torque at the output shaft for a given axial length than comparable configurations of traditional servomotor/gearbox combinations. An electrically-actuated brake and motor feedback position resolver provide greater control of the output torque and speed curve. The servomotor rotor, input shaft of the gearbox, and output shaft of the gearbox are provided with roller bearings for reduced system friction. The invention may be packaged in an environmentally sealed housing that is sealed with, for example, O-rings, lip seals and gaskets.

The brushless DC servomotor drives a planetary gearbox to produce rotary motion and torque at the output shaft. The system is scalable to generate the necessary torques and speeds of output that the driven system requires. The mounting flange (at the output shaft) may be configured for various mounting schemes. The outboard flange (opposite the mounting flange) may be used to house and mount auxiliary components, such as feedback devices (resolvers, tachometer, switches) and control devices (brakes, shock absorbers/dampers).

Figure 1:
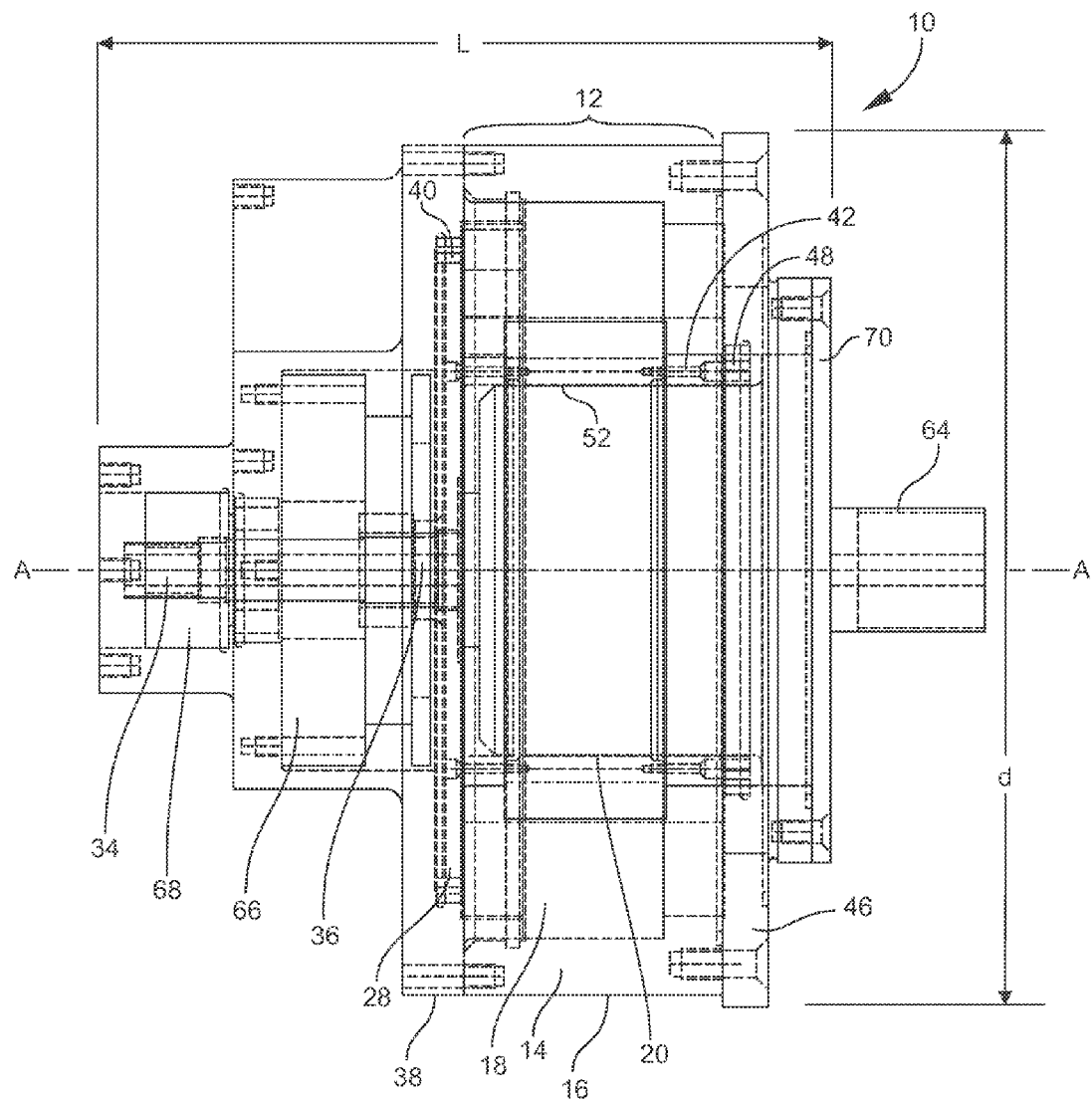
FIG. 1 is a side view of one embodiment of a concentric electric motor and gearbox drive system.
Figure 2:
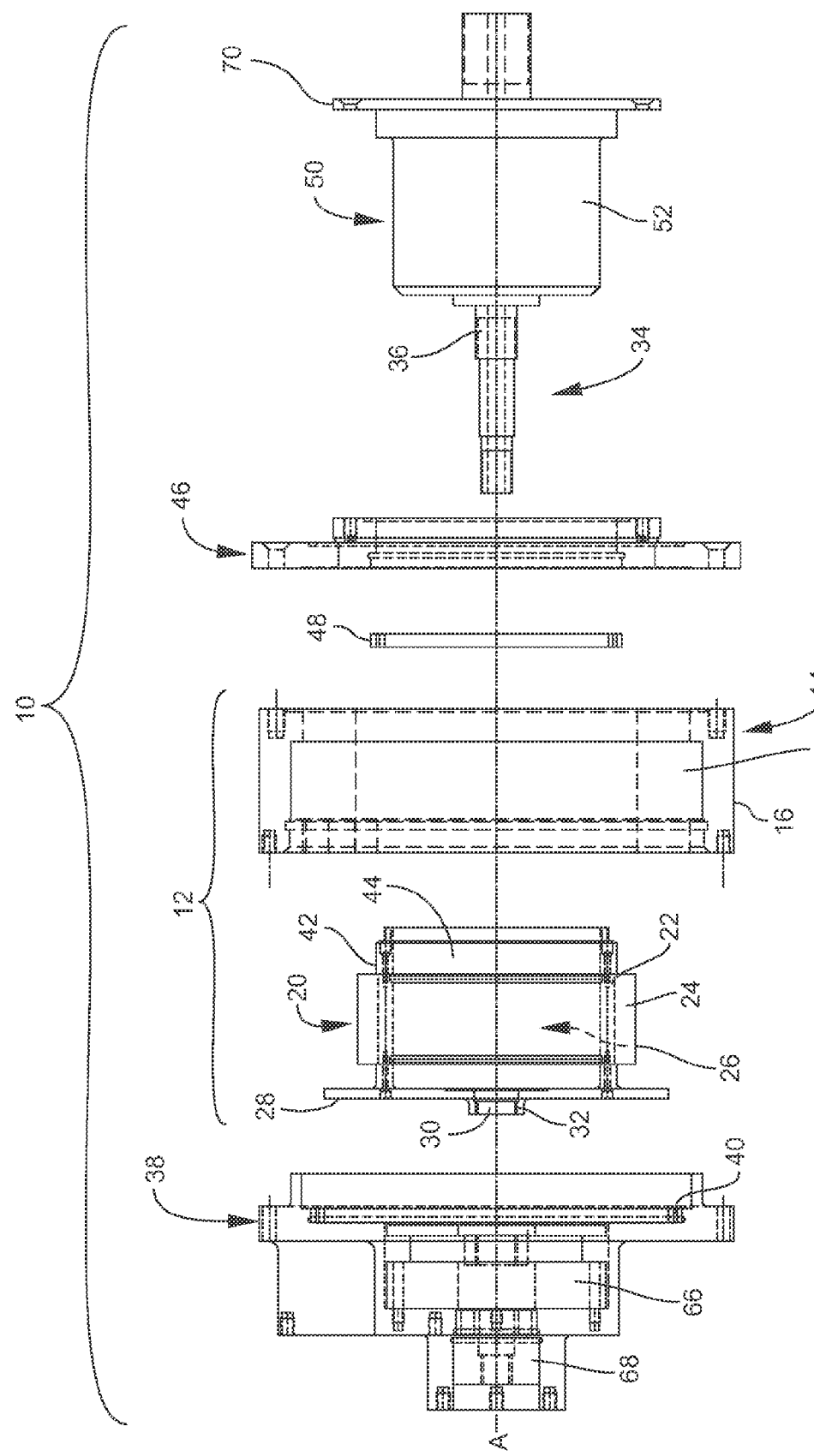
FIG. 2 is an exploded view of the drive system of FIG. 1.
Figure 6:
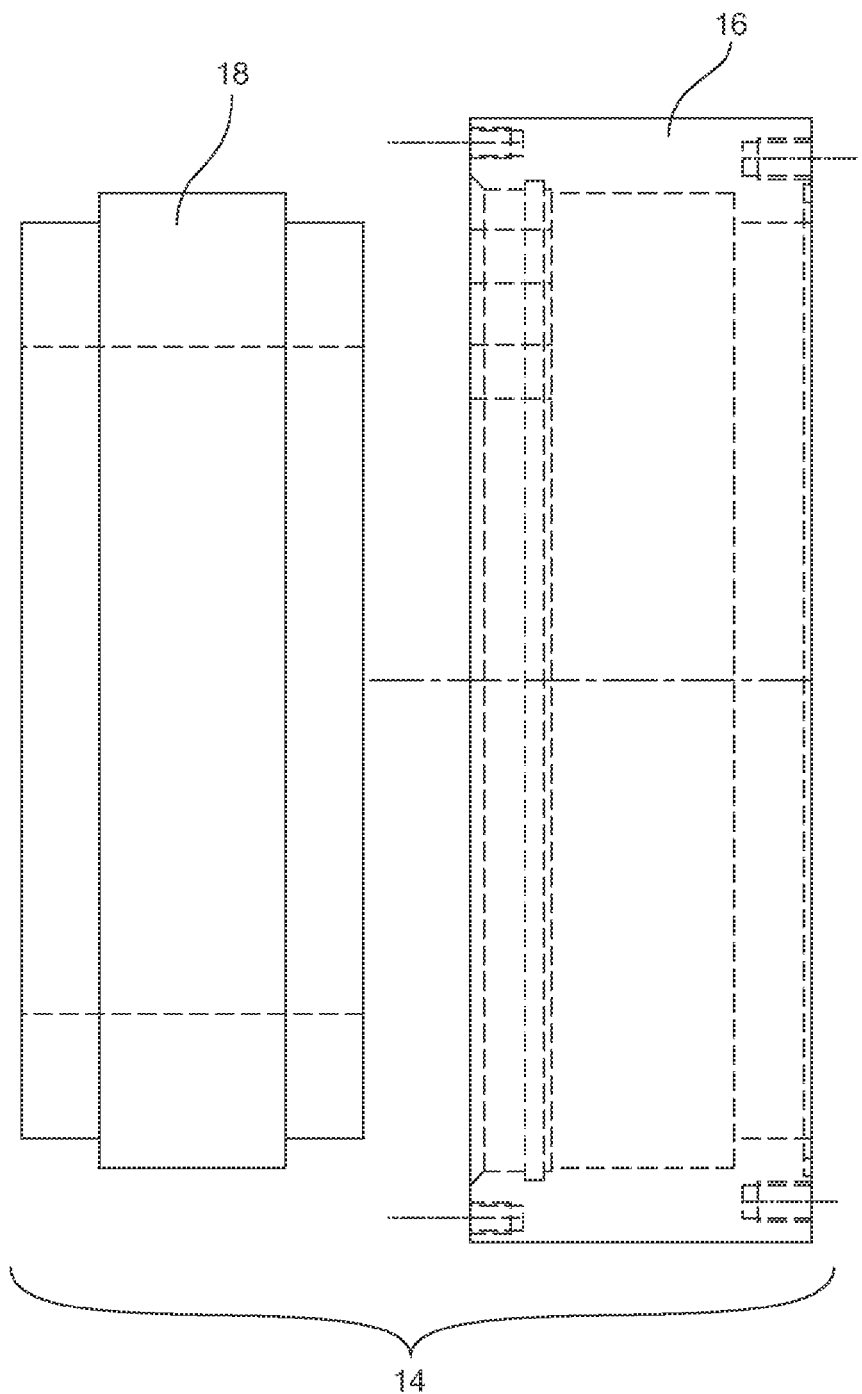
FIG. 6 is an exploded view of a stator for a brushless DC electric motor.

FIG. 1 is a side view of one embodiment of a concentric electric motor and gearbox drive system 10 having a central longitudinal axis A. FIG. 2 is an exploded view of drive system 10 of FIG. 1. Drive system 10 includes a brushless DC servomotor 12 having a stator 14 and a rotor 20. Stator 14 includes a stator housing 16 and stator motor windings 18. FIG. 6 is an exploded view of stator 14. Stator housing 16 may be made of aluminum or another material that efficiently dissipates the heat generated in servomotor 12. Stator housing 16 includes openings (not shown) for electrical connectors to motor windings 18. Rotor 20 is disposed radially interior of stator motor windings 18. Rotor 20 includes a hollow cylindrical base 22 and a plurality of magnets 24 fixed to a radially exterior surface of base 22. Hollow cylindrical base 22 defines a central void space 26. Stator 14 and rotor 20 are coaxial with central longitudinal axis A.

Figure 3:
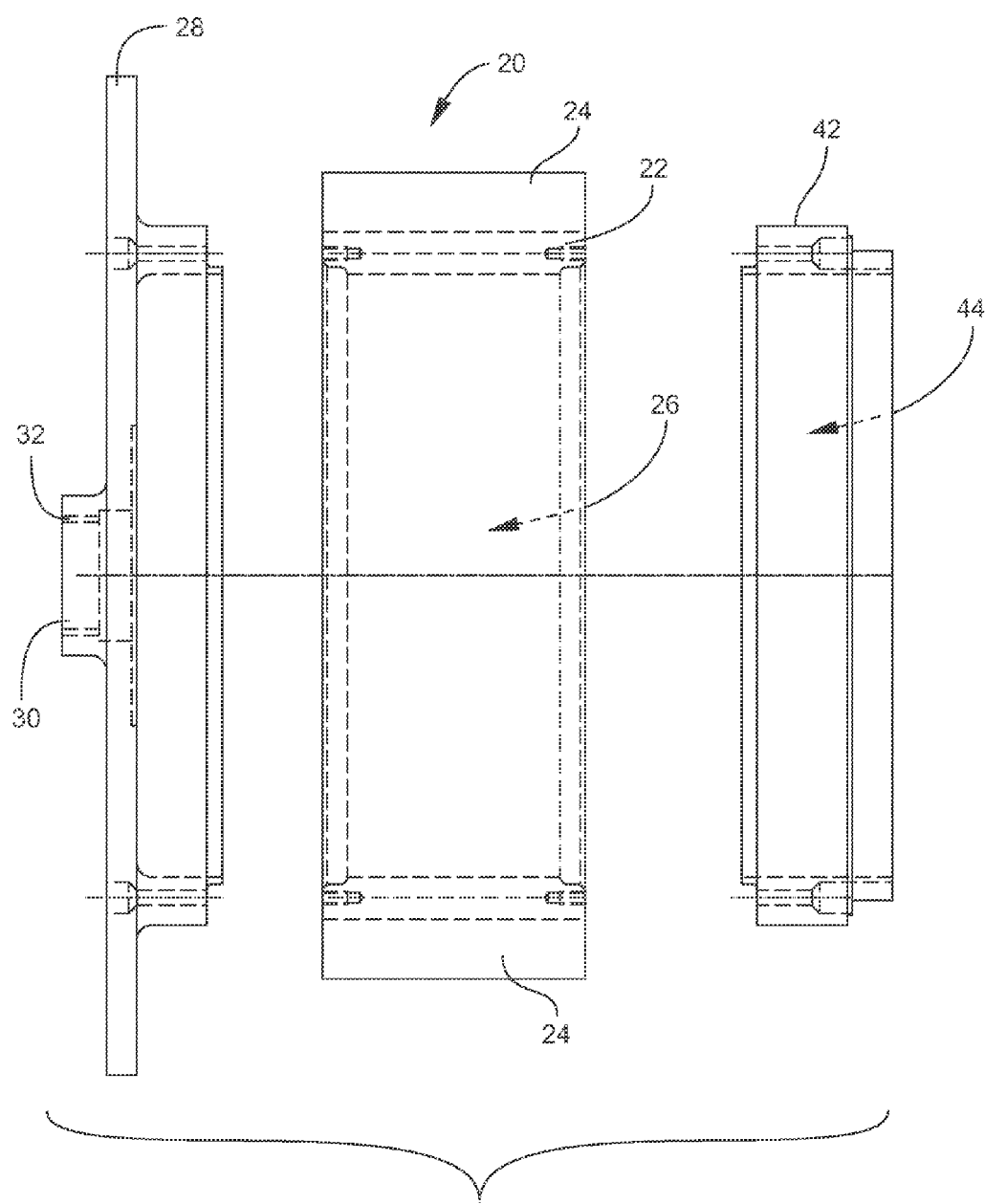
FIG. 3 is an exploded view of a rotor assembly for a brushless DC electric motor.
Figure 4:
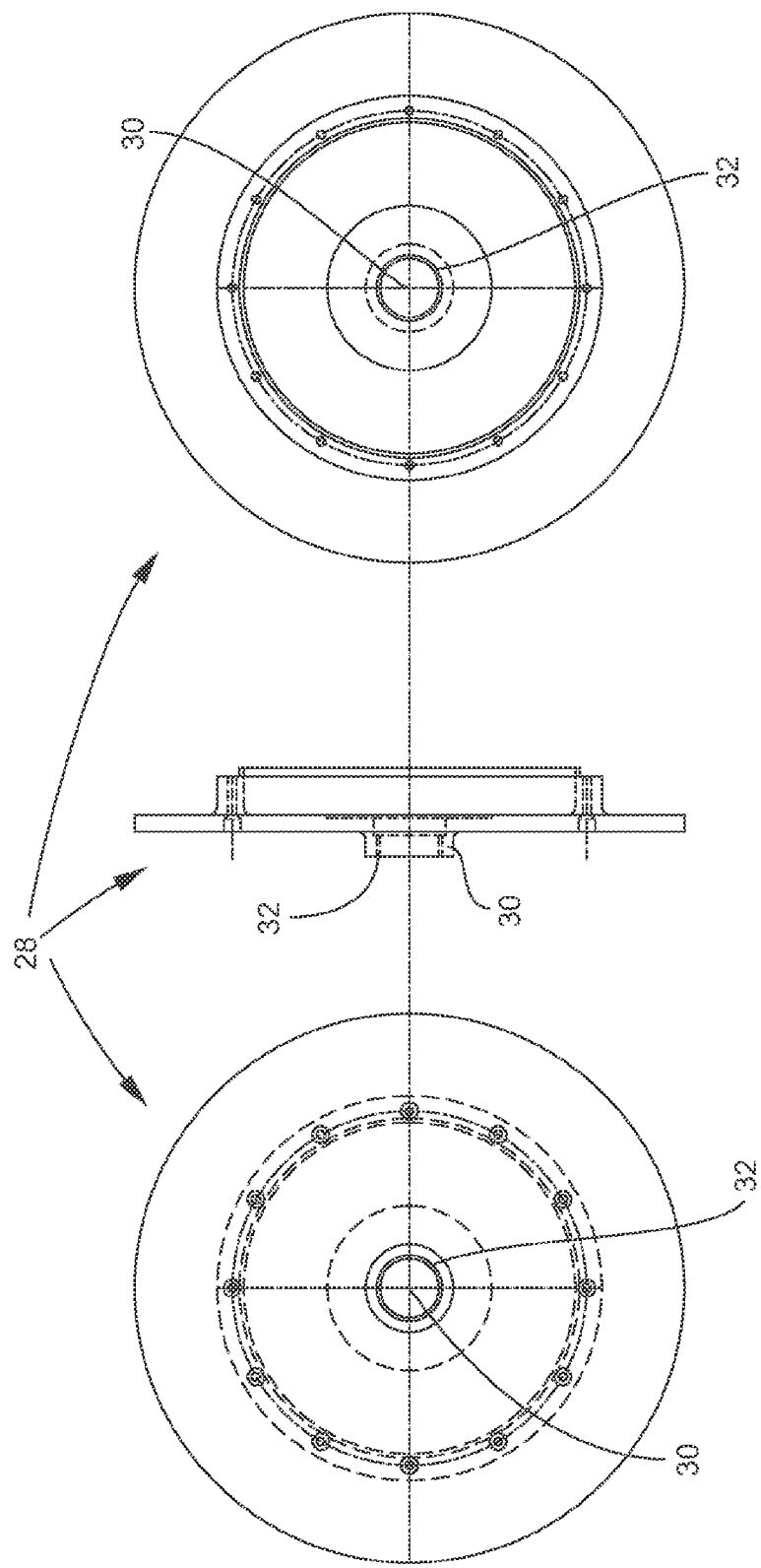
FIGS. 4A-C are end, side, and opposite end views, respectively, of one rotor flange.

A first rotor flange 28 is coaxially fixed to one end of rotor 20 and a second rotor flange 42 is coaxially fixed to another end of rotor 20. FIG. 3 is an exploded view of rotor 20 and flanges 28, 42. FIGS. 4A-C are end, side, and opposite end views, respectively, of rotor flange 28. Rotor flange 28 defines a central opening 30 that is coaxial with central longitudinal axis A. Rotor flange 28 includes a first portion 32 of a two-portion torque transfer mechanism. In the embodiment shown, first portion 32 is a female spline.

An input shaft 34 is disposed coaxially with brushless DC servomotor 12. Input shaft 34 includes a second portion 36 of the two-portion torque transfer mechanism. In the embodiment shown (FIG. 2), second portion 36 is a male spline. Second portion 36 of input shaft 34 engages first portion 32 of rotor flange 28 to thereby transfer torque from rotor 20 to input shaft 34. Rather than mating splines, other torque transfer mechanisms may be used, for example, keys and keyways.

Figure 7:
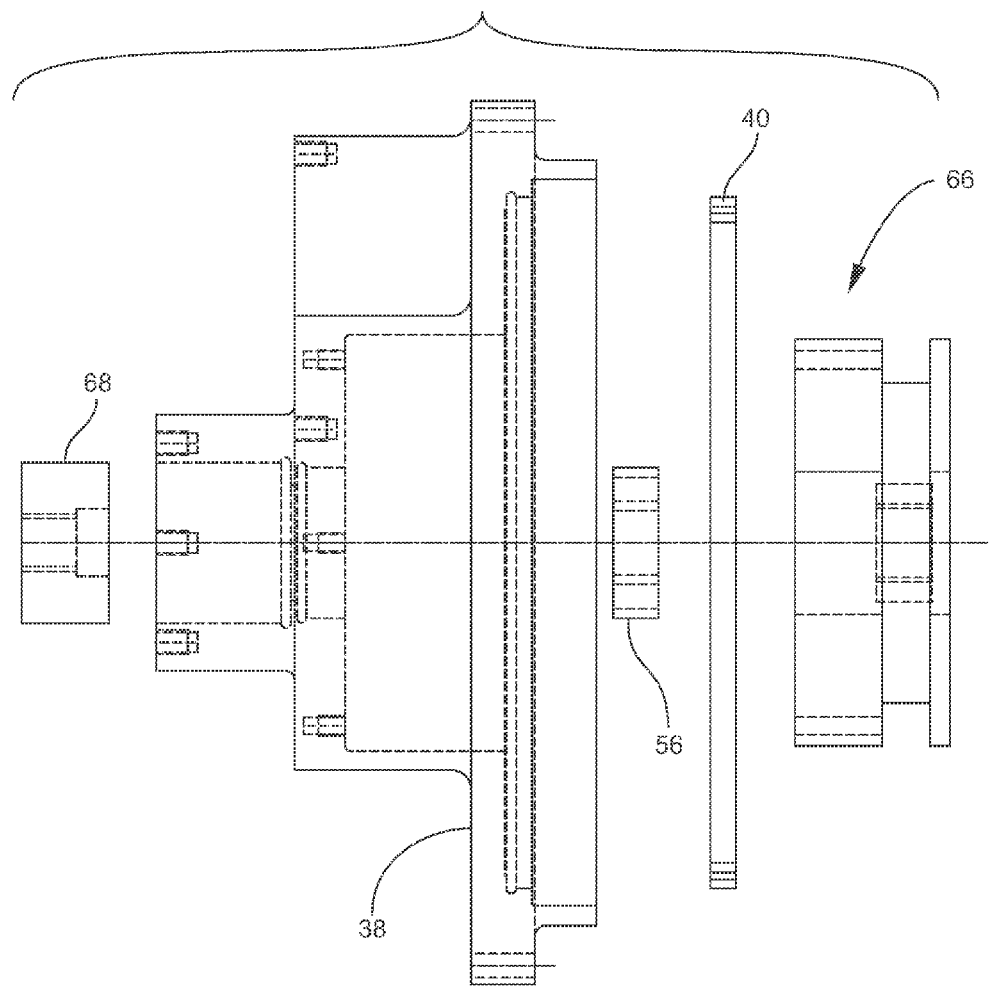
FIG. 7 is an exploded view of one stator flange assembly.

A first stator flange 38 is fixed to one end of stator housing 16 and is coaxial with central longitudinal axis A. FIG. 7 is an exploded view of stator flange 38. Rotor flange 28 is concentrically disposed within first stator flange 38. A roller bearing 40 is interposed between stator flange 38 and rotor flange 28 to support one end of rotor 20.

Figure 5:
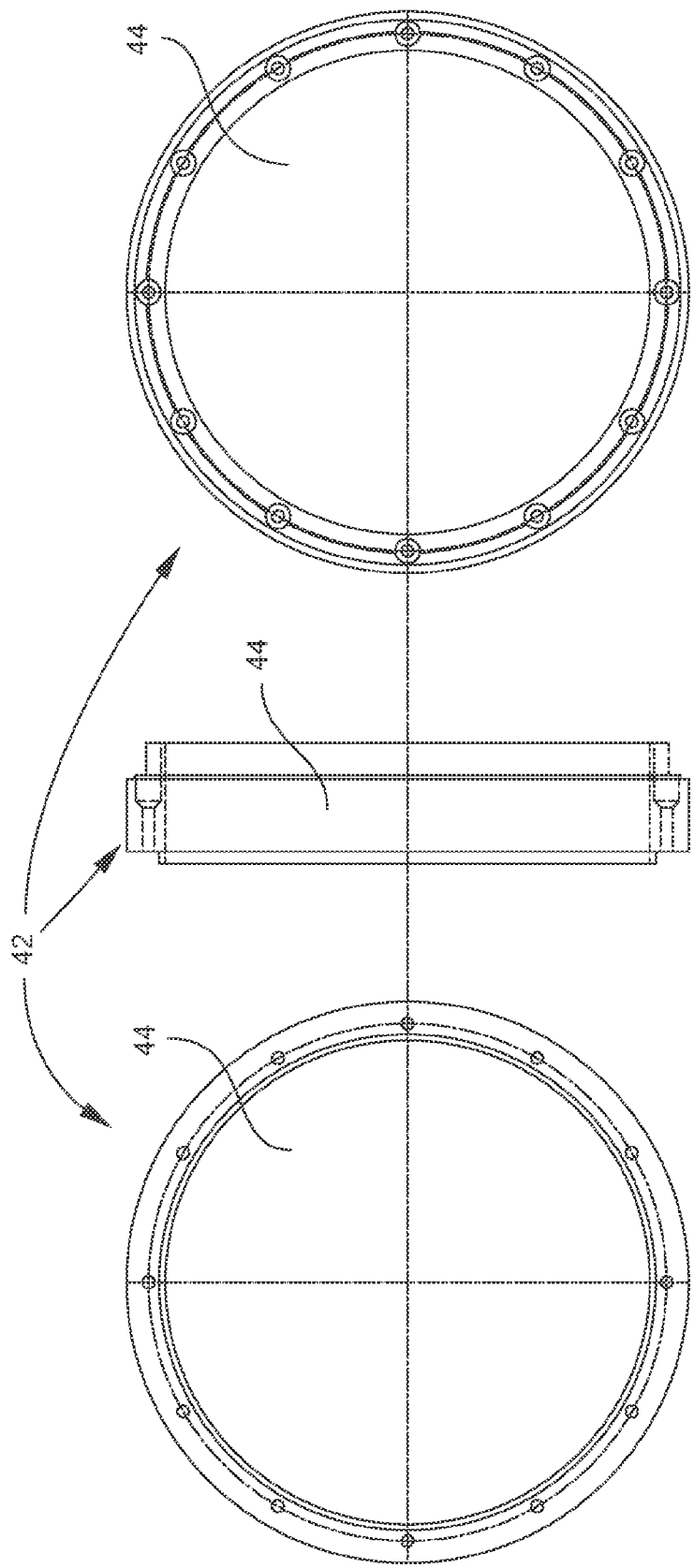
FIGS. 5A-C are end, side, and opposite end views, respectively of another rotor flange.
Figure 8:
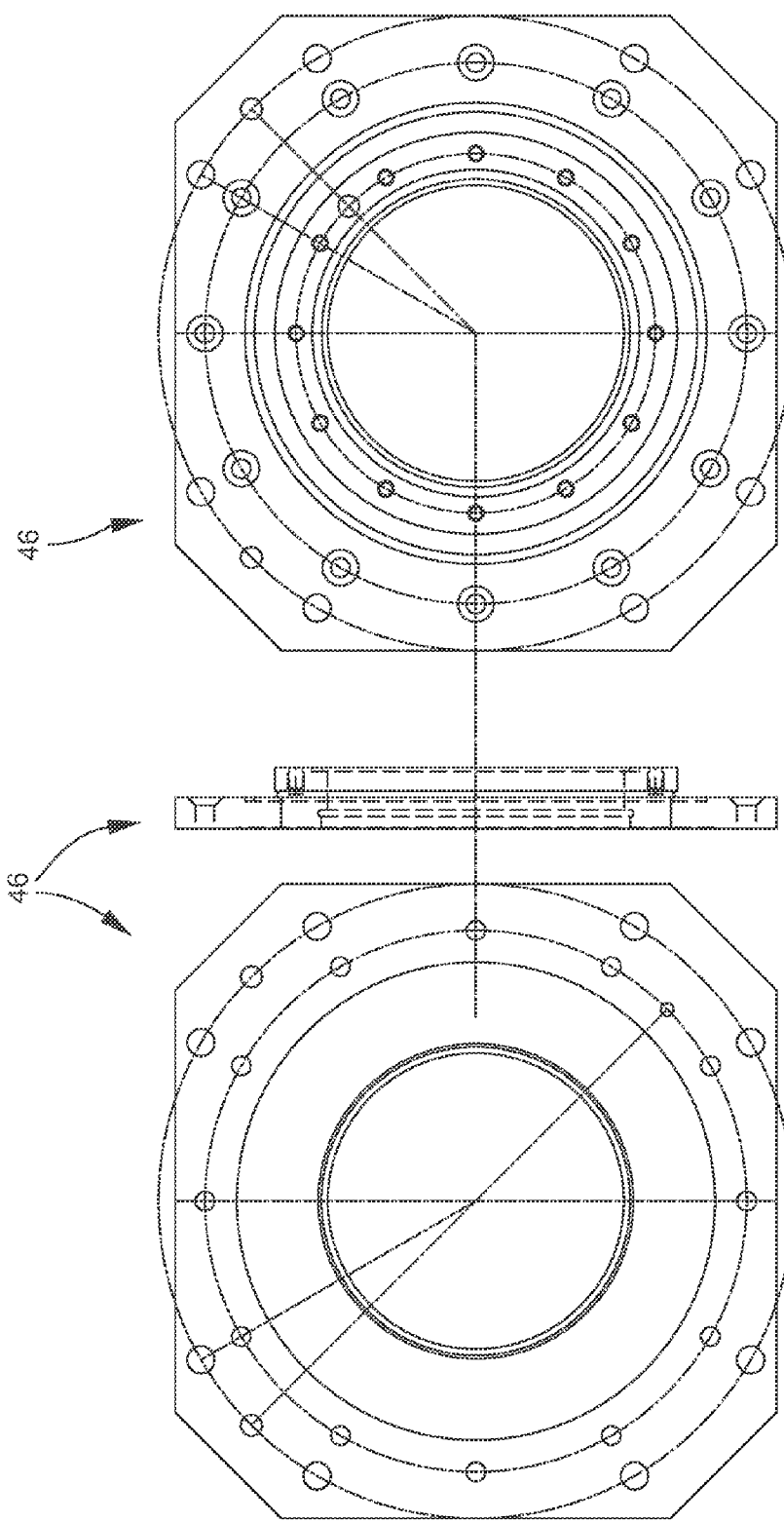
FIGS. 8A-C are end, side, and opposite end views, respectively, of another stator flange assembly.

Second rotor flange 42 defines a central opening 44 (FIGS. 5A-C) coaxial with central longitudinal axis A. A second stator flange 46 (shown in more detail in FIGS. 8A-C) is fixed to another end of stator housing 16 and is coaxial with central longitudinal axis A. Second rotor flange 42 is concentrically disposed within second stator flange 46. A roller bearing 48 is disposed between second stator flange 46 and second rotor flange 42 to support the other end of rotor 20. A planetary gear assembly 50 having a planetary gear housing 52 is fixed to second stator flange 46 via a planetary gear assembly mounting flange 70. Planetary gear assembly 50 is concentric with central longitudinal axis A. Central opening 44 in second rotor flange 42 has a larger diameter than the diameter of planetary gear housing 52.

Figure 9:
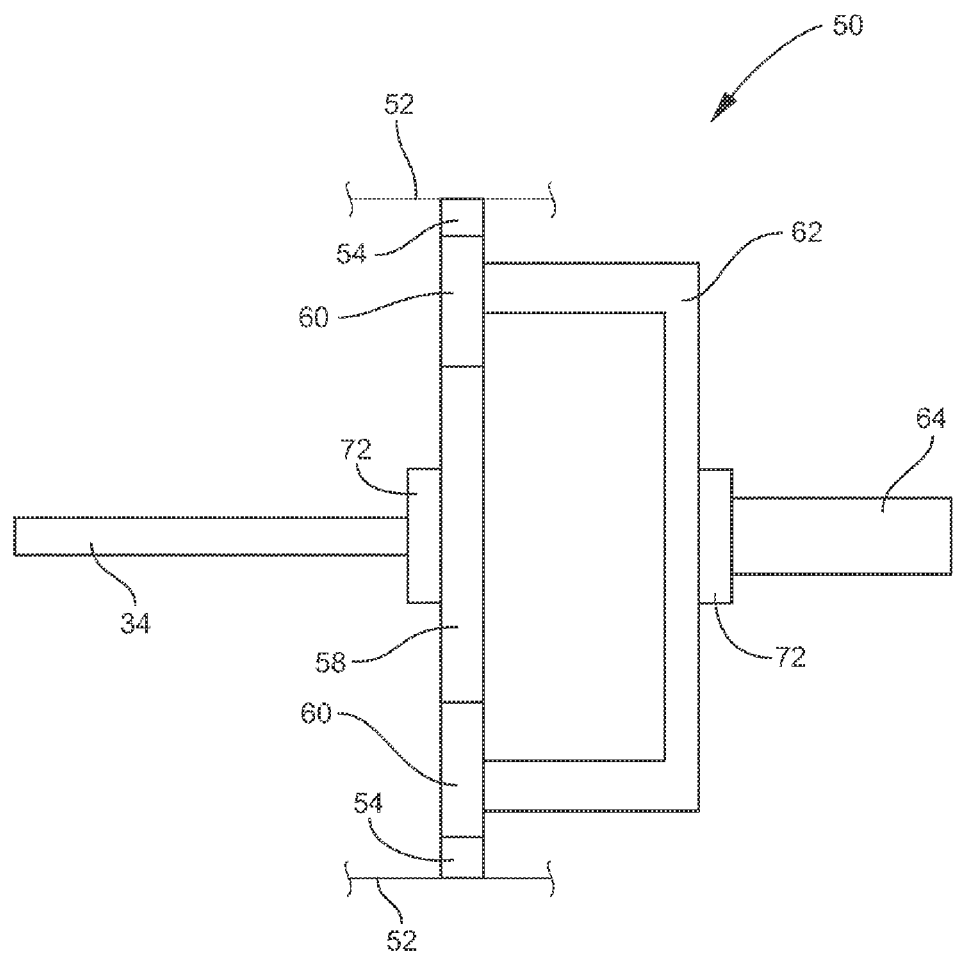
FIG. 9 is a schematic drawing of a planetary gear assembly.

FIG. 9 is a schematic drawing of a planetary gear assembly. Planetary gear assembly 50 includes a housing 52 with a ring gear 54 on an interior of housing 52. Housing 52 is disposed in central void space 26 of rotor 20. The disposition of housing 52 in central void space 26 is important to obtain one of the invention's primary advantages, namely, the reduced axial space claim for an electric motor/gearbox drive system. Input shaft 34 extends into housing 52 and is rotatable with respect to housing 52.

Referring to FIG. 9, planetary gear assembly 50 further includes a sun gear 58 fixed to and rotatable with input shaft 34 and a plurality of planet gears 60 that simultaneously mesh with both ring gear 54 and sun gear 58. Planetary gear assembly 50 further includes a carrier 62 rotatably fixed to each of planet gears 60. Carrier 62 includes an output shaft 64 that is coaxial with central longitudinal axis A. Output shaft 64 extends through planetary gear housing 52. Output shaft 64 provides the rotary motion and torque for the device to be driven by drive system 10. The relative sizes of sun gear 58, planet gears 60 and ring gear 54 may be chosen depending on the output speed and torque desired. Multiple planetary gear stages may be used. Roller bearings 72 are used internally in planetary gear housing 52 to support both input shaft 34 and output shaft 64.

Optionally, first stator flange 38 may include a housing for an electric brake 66 mounted on input shaft 34. FIG. 7 is an exploded view of first stator flange 38 and other components. Brake 66 may be used to control rotary motion of input shaft 34. First stator flange 38 may also include a housing for a resolver 68 mounted on input shaft 34. Resolver 68 may be used as a motion feedback sensor to provide velocity and position information for closed-loop electronic control, as well as brushless DC motor commutation. A roller bearing 56 may be used to support input shaft 34 coaxially within first stator flange 38 (FIG. 7). First stator flange 38 may be made of aluminum or another material that efficiently dissipates the heat generated from brake 66.

Environmental sealing of drive system 10 is provided by O-rings, lip seals, and gaskets. For example, O-rings may be used between stator housing 16 and first and second stator flanges 38, 46, respectively, and between planetary gearbox mounting flange 70 (FIG. 2) and second stator flange 46.

To create a large power density per unit of axial length (along central longitudinal axis A), a large diameter, short axial length, frameless motor 12 is used. The large diameter of motor 12 results in a large diameter central void space 26 in the interior of rotor 20. The large void space 26 enables planetary gear housing 52 to be disposed therein. In the embodiment of FIG. 1, dimension d is the outer diameter of stator housing 16. Dimension L is the overall length of drive system 10 measured from planetary gear assembly mounting flange 70 to the end of first stator flange 38. The value of L/d is about one or less than one. If first stator flange 38 does not include a housing for resolver 68 and/or a housing for electric brake 66, then L/d will be even less.

While the invention has been described with reference to certain embodiments, numerous changes, alterations and modifications to the described embodiments are possible without departing from the spirit and scope of the invention as defined in the appended claims, and equivalents thereof.

What is claimed is:

1. A drive system with a central longitudinal axis, comprising:
   a brushless DC servomotor having a stator with a stator housing and stator motor windings and a rotor disposed radially interior of the stator motor windings, the rotor having a hollow cylindrical base and a plurality of magnets fixed to a radially exterior surface of the base, the hollow cylindrical base defining a central void space, the stator and rotor being coaxial with the central longitudinal axis;
   a first rotor flange coaxially fixed to one end of the rotor, the first rotor flange defining a central opening coaxial with the central longitudinal axis, the first rotor flange including a first portion of a two-portion torque transfer mechanism;
   an input shaft disposed coaxially with the brushless DC servomotor, the input shaft including a second portion of the two-portion torque transfer mechanism, the second portion being in engagement with the first portion on the first rotor flange;
   a first stator flange fixed to one end of the stator housing and coaxial with the central longitudinal axis, the first rotor flange being concentrically disposed within the first stator flange;
   a roller bearing interposed between the first stator flange and the first rotor flange to support the one end of the rotor;
   a second rotor flange coaxially fixed to another end of the rotor, the second rotor flange defining a central opening coaxial with the central longitudinal axis;
   a second stator flange fixed to another end of the stator housing and coaxial with the central longitudinal axis, the second rotor flange being concentrically disposed within the second stator flange;
   a second roller bearing disposed between the second stator flange and the second rotor flange to support the other end of the rotor;
   a planetary gear assembly fixed to the second stator flange and concentric with the central longitudinal axis, the planetary gear assembly including a housing with a ring gear on an interior of the housing, the housing being disposed in the central void space of the rotor, the input shaft extending into the housing and being rotatable with respect to the housing, the planetary gear assembly further including a sun gear fixed to and rotatable with the input shaft and a plurality of planet gears that simultaneously mesh with both the ring gear and the sun gear, the planetary gear assembly further including a carrier rotatably fixed to each of the planet gears; and
   an output shaft rotatably fixed to the carrier and coaxial with the central longitudinal axis, the output shaft extending through the planetary gear housing;
   wherein the drive system has an overall length L and an external diameter d and L/d is about one or less than one.

2. The drive system of claim 1, further comprising an electric brake disposed on the input shaft.

3. The drive system of claim 2, further comprising a resolver disposed on the input shaft.

4. The drive system of claim 1, wherein the central opening in the second rotor flange has a larger diameter than a diameter of the planetary gear housing.

5. The drive system of claim 1, wherein the external diameter d is an external diameter of the stator housing.

6. The drive system of claim 1, wherein the planetary gear assembly includes a mounting flange and the overall length L is a distance between the planetary gear assembly mounting flange and the first stator flange.

7. The drive system of claim 3, wherein the planetary gear assembly includes a mounting flange, the electric brake and the resolver are disposed in housings in the first stator flange, and the overall length L is a distance between the planetary gear assembly mounting flange and the first stator flange.

8. A drive system with a central longitudinal axis, comprising:
   a brushless DC servomotor having a stator and a rotor disposed radially interior of the stator, the rotor defining a central void space, the stator and rotor being coaxial with the central longitudinal axis;
   a first rotor flange coaxially fixed to one end of the rotor, the first rotor flange defining an opening that is coaxial with the central longitudinal axis, the first rotor flange including a spline disposed around the opening;
   an input shaft having a spline that engages the spline of the first rotor flange, the input shaft being coaxial with the brushless DC servomotor;
   a first stator flange fixed to one end of the stator housing, the first rotor flange being concentrically disposed within the first stator flange;
   a roller bearing interposed between the first stator flange and the first rotor flange to support the one end of the rotor;
   a second rotor flange coaxially fixed to another end of the rotor, the second rotor flange defining an opening coaxial with the central longitudinal axis;
   a second stator flange fixed to another end of the stator housing, the second rotor flange being concentrically disposed within the second stator flange;
   a second roller bearing disposed between the second stator flange and the second rotor flange to support the other end of the rotor;

a planetary gear assembly fixed to the second stator flange, the planetary gear assembly including a housing with a ring gear on an interior of the housing, the housing being disposed in the central void space of the rotor, the input shaft extending into the housing and being rotatable with respect to the housing, the planetary gear assembly further including a sun gear fixed to and rotatable with the input shaft and a plurality of planet gears that simultaneously mesh with both the ring gear and the sun gear, the planetary gear assembly further including a carrier rotatably fixed to each of the planet gears; and an output shaft rotatably fixed to the carrier and coaxial with the central longitudinal axis, the output shaft extending through the planetary gear housing;

wherein the drive system has an overall length L and an external diameter d and L/d is about one or less than one.

9. The drive system of claim 8, further comprising an electric brake disposed on the input shaft.

10. The drive system of claim 9, further comprising a resolver disposed on the input shaft.

11. The drive system of claim 8, wherein the opening in the second rotor flange has a larger diameter than a diameter of the planetary gear housing.

12. The drive system of claim 8 wherein the external diameter d is an external diameter of the stator.

13. The drive system of claim 8, wherein the planetary gear assembly includes a mounting flange and the overall length L is a distance between the planetary gear assembly mounting flange and the first stator flange.

14. The drive system of claim 10, wherein the planetary gear assembly includes a mounting flange, the electric brake and the resolver are disposed in housings in the first stator flange, and the overall length L is a distance between the planetary gear assembly mounting flange and the first stator flange.

* * * * *